Feb. 17, 1925. 1,526,789
W. H. HUTTER
GRIPPING DEVICE
Filed Jan. 31, 1923    2 Sheets-Sheet 1
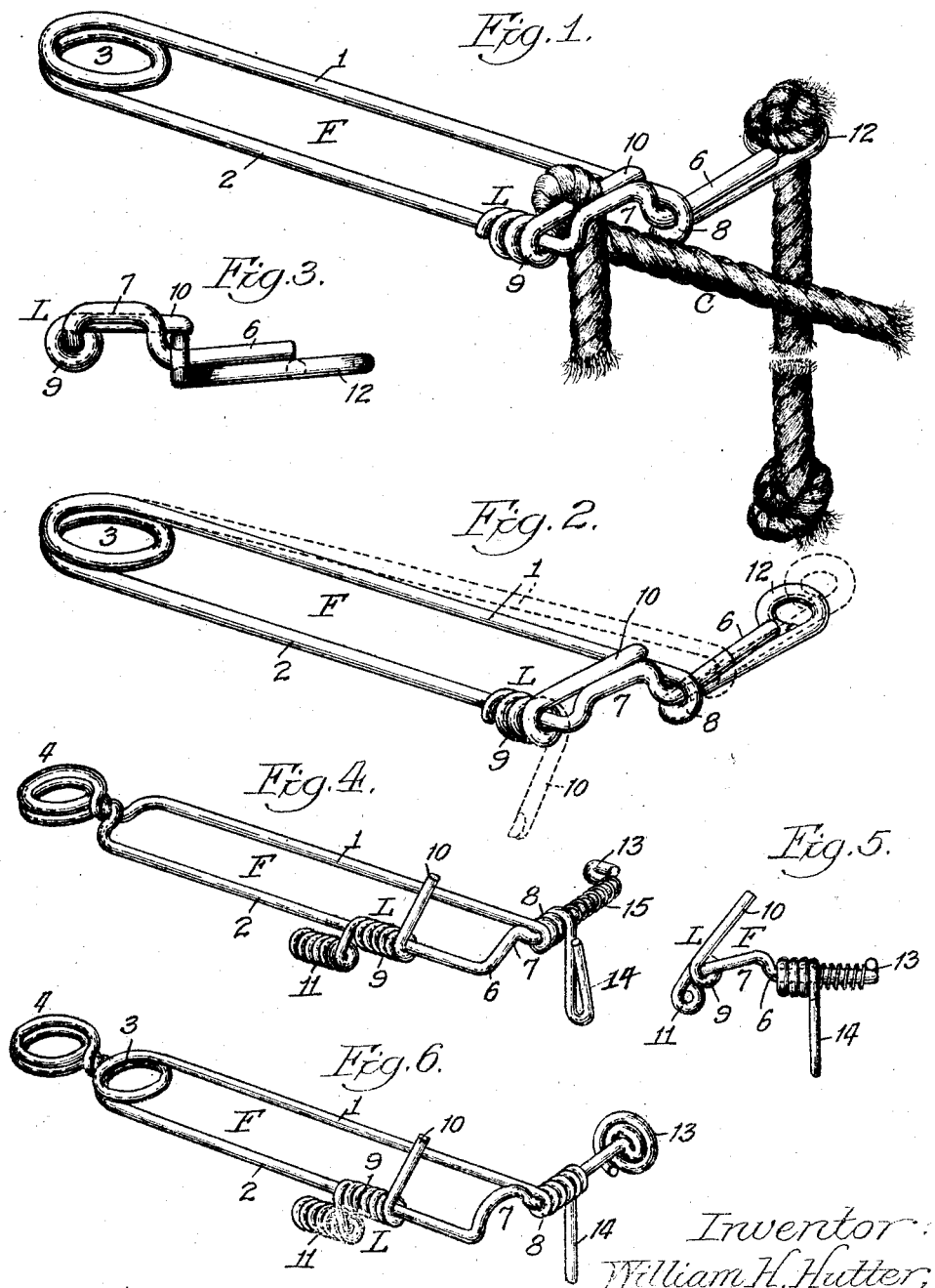

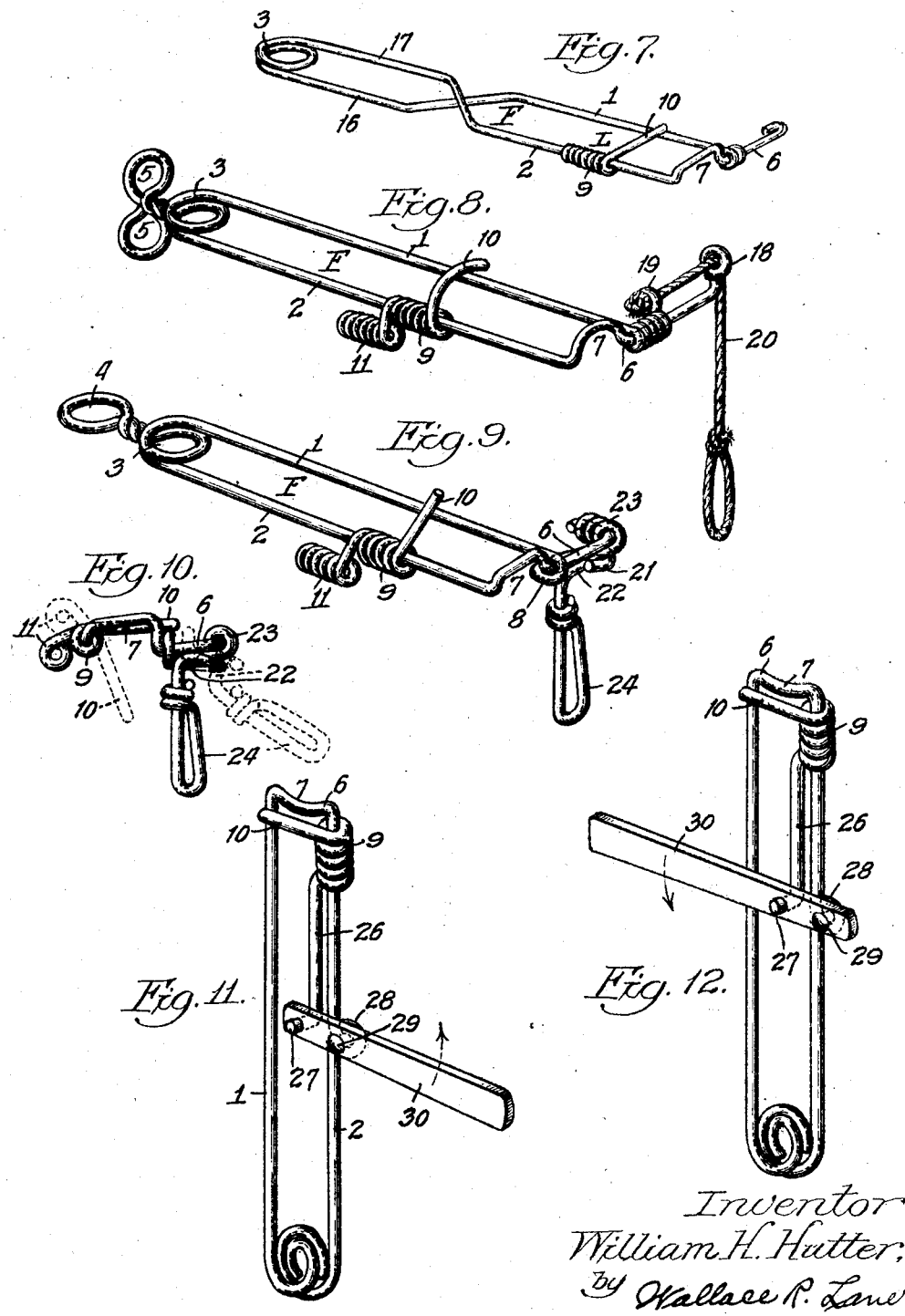

Patented Feb. 17, 1925.

1,526,789

UNITED STATES PATENT OFFICE.

WILLIAM HASTINGS HUTTER, OF GLEN ELLYN, ILLINOIS.

GRIPPING DEVICE.

Application filed January 31, 1923. Serial No. 615,995.

*To all whom it may concern:*

Be it known that I, WILLIAM H. HUTTER, a citizen of the United States, residing at Glen Ellyn, Illinois, have invented certain new and useful Improvements in Gripping Devices, of which the following is a specification.

My present invention relates to a gripping device designed especially for releasably holding such things as ropes and cords, and may be used for such purposes as fastening clothes lines, tennis nets, tying packages, holding scaffolding ropes, etc. Among the objects of this invention are, to produce a new securing means for flexible ropes, cords, and the like, which will permit easy application and release of said securing means; to produce a structure of the character indicated which will securely hold flexible members in adjusted position; to produce a structure of the character indicated having easily operated means for securing flexible lines, etc., in place; to produce a device of the character stated having readily yielding resilient means for holding the parts in proper operative position and permitting the same to be moved into releasing position; and such further objects, advantages, and capabilities as will later more fully appear.

My invention further resides in the combination, construction and arrangement of parts illustrated in the accompanying drawings, and, while I have shown therein preferred embodiments, I desire the same to be understood as illustrative only, and not as limiting my invention.

In the accompanying drawings, Fig. 1 is a perspective view of one form of my gripping device showing a flexible member held thereby and having a flexible member attached thereto, for operation of the parts. Fig. 2 is a perspective view similar to Fig. 1 but showing in dotted lines the operation of this device. Fig. 3 is an end view of the construction shown in Figs. 1 and 2. Fig. 4 is a perspective view of a modification of the device shown in Fig. 1. Fig. 5 is an end view of the construction shown in Fig. 4. Fig. 6 is a perspective view of a modification of the structure shown in Fig. 4. Fig. 7 is a perspective view of a further modification of the device shown in Fig. 1. Figs. 8 and 9 are perspective views of still other modifications. Fig. 10 is an end view of the structure shown in Fig. 9. Fig. 11 shows a still further modification for use in securing scaffolding ropes. Fig. 12 is a modification of the structure shown in Fig. 11.

Referring more in detail to the annexed drawings, reference character F designates the frame, in general, while the reference letter L denotes in general the latch. The frame F has a pair of normally substantially parallel side members, 1 and 2, connected together at one end in any one of various ways, depending upon the purpose for which the device is intended. In all of the forms, except those shown in Figs. 4, 11 and 12, the side elements, 1 and 2, are connected by a resilient loop 3, which is relied upon to give the necessary resiliency, in conjunction with the side elements, to hold these side elements in their normal operative position. If desired, this resilient loop 3 may be used as the attaching means for this end of the gripping member, but it is preferred to, in some instances, provide a separate attaching loop 4, as shown in Figs. 4, 6, 8 and 9.

As shown in Figs. 6, 8 and 9, it is contemplated to use both loops 3 and 4 in some instances. In the form of execution shown in Fig. 8, the attaching means 4 is replaced by a pair of loops 5. These loops are arranged substantially in a plane approximately perpendicular to the axis of the gripping device, the purpose being to so arrange them that screws may be passed therethrough into a supporting member, such as a wooden post or wall. It will of course be understood that this end of the gripping device may be attached to a rope, cord, chain, or other equivalent flexible device, or the same may be attached to a rigid device such as a hook, a screw eye or the like.

The opposite ends of the side elements 1 and 2 are connected by a cross element 6, preferably bent upwardly, slightly, as shown at 7, so that this cross element will cooperate in a better way with the latching member L. As shown in most of the figures, it is preferred to have the end of the side element 1 looped around the cross bar or element 6 in such a way as to form a guiding loop 8 for guiding the relative lateral movement of these two elements. It will be seen from the foregoing that the side elements 1 and 2 are relatively movable, laterally, with respect to each other, the purpose being to release the latch member L so that the flexible member C may be detached therefrom.

The latch member L, in its simplest form, comprises a coil 9 pivotally secured, either directly or indirectly, to one of the side elements 1 and 2, said coil having a cross bar 10 extending out far enough to engage the other side element, in its normal operative position. Preferably, coil 9 has several turns formed alongside element 2 so as to give a sufficient bearing thereon to hold the cross bar 10 against unreasonable play. It is sometimes desirable to provide the latch L with a weight 11 which will serve to hold the cross bar 10 in position when there is nothing to force it into another position. This weight is preferably formed by coiling the end of the wire from which the latch is made, in the manner shown in Figs. 4, 5 and 6. It is therefore clear that when the side bars or elements 1 and 2 are separated as shown in dotted line position in Fig. 2, the flexible member C will cause the cross bar 10 to go through between the two side elements into the dotted line position shown in this figure. When this happens, the tendency of the weight 11 is to carry the latch on around until it occupies substantially the position shown in Figs. 4, 5 and 6, in which position it is ready to have the flexible member C attached.

Various means are shown in the drawings for releasing the latch member L from its engagement with the side element 1. In Figs. 1 and 2 this is to be done by attaching a rope or a cord to a loop 12 at the end of element 1. This cord is to be pulled laterally and downwardly to cause the loop 8 to slide on cross bar 6 and carry side element 1 away from side element 2, thereby releasing cross bar 10 from element 1, thus permitting the latch L to turn on its mounting. In the structures shown in Figs. 4, 5, and 6, the end of cross bar 6 is formed into a finger piece 13, while the end of side element 1 is formed into a finger piece 14. It is clear that by pushing longitudinally of cross bar 6, by means of a finger placed on finger piece 13 and, at the same time, pulling on finger piece 14, the elements 1 and 2 will be caused to separate, thus permitting the latch L to turn about its pivot. The structure shown in Fig. 6 is provided with the resilient loop 3 and will therefore ordinarily not require any additional resilient means to return the elements 1 and 2 to their normal position. In the construction shown in Fig. 4 a spring 15 surrounds cross bar 6 between finger pieces 13 and 14 and will furnish all the necessary additional resilience required in places where the coil 3 is omitted or the material used does not have sufficient inherent resilience. It is of course understood that the form shown in Fig. 6 may be provided with a spring 15 if desired.

It is contemplated that the structure shown in Fig. 7 will be made in various sizes, but its primary purpose is for use in the tying of packages, and it will therefore, ordinarily, be made in a size smaller than that shown in Fig. 7. The operation of this form, for the release of the flexible member, is accomplished by pressing on the portions 16 and 17 of the side elements 1 and 2. It will be clear that this will cause separation of the side elements, thereby releasing latch member L from its engagement with member 1.

In the form shown in Fig. 8, cross bar 6 is provided at its end with a loop 18 and the end of side element 1 with a loop 19, a cord or equivalent flexible element 20 being connected to the latter and passed through the former, so that a pull thereon will cause separation of the side elements 1 and 2, for the release of latch member L, as heretofore described. The same result is accomplished in the form shown in Fig. 9 by providing a bend 21 of an end of side element 1, which bend may be engaged by a lever 22 secured at 23 to the end of cross bar 6. The lever 22 is preferably provided with means 24 for the attachment of a cord or equivalent flexible means, and it will be seen that a pull thereon will cause the lever 22 to turn about its pivot, thus separating side elements 1 and 2, as shown in dotted lines in Fig. 10.

In the forms shown in Figs. 11 and 12, the cross bar 6 is integral or rigidly connected to both side elements 1 and 2, while the opposite ends of these elements are secured together in any desired manner, as by intercoiling the ends, as shown in Figs. 11 and 12. The end 26 of coil 9 is here shown as being extended substantially parallel to the side element 2, and having its extremity 27 bent at substantially right angles to pass through or be engaged by a lever 30 pivoted on a pin 29 secured in a loop 28 formed in the side of element 2 intermediate its ends. It is considered preferable to have the extremity 27 extend through an opening in the lever, so that it may be secured therein by riveting its end.

These two forms are particularly designed for the holding of scaffolding ropes. They are therefore normally made heavier than the other forms.

On account of the extra and continuous strain placed upon the structures of Figs. 11 and 12, when in use, it is believed essential to dispense with the relative lateral movability of the side elements and to rely upon operating mechanism for the latch member L to make it possible to release the held flexible member so that the same may be operated. The dotted arrows used in connection with the levers 30 in Figs. 11 and 12 indicate the direction of motion of these levers which will cause release of the flexible member held by the latch member L.

The use of this device will now be explained in connection with a clothes line, or the like, as illustrated in Fig. 1. With the latch L in such a position as that shown in Figs. 4 and 6, a loop is formed in the cord C and is slipped over the cross bar 10, the cord being then drawn taut. This will pull the latch member along the side elements 1 and 2 until the cord is held between the cross bars 6 and 10. When gripped tightly between these cross bars it will be almost impossible for the flexible member to slip, since the greater the pull on the cord C the greater the pressure upon that portion of the cord which passes between the cross bars 6 and 10, and the tighter will be the grip thereon. However, when it is desired to release the cord or the like, from the position shown in Fig. 1, it is only necessary to cause relative lateral movement between the side elements 1 and 2 sufficient to permit the latch member L to turn about its axis, so that pressure on the flexible member between the cross bars 6 and 10 will be decreased, and the flexible member thereby released.

These devices will be made in various forms, sizes, and proportions, in accordance with the various uses to which the same are to be put, several thereof having already been made. It is, of course, understood that the specific description of structures set forth above may be departed from without departing from the spirit of my invention, as set forth in this specification and the appended claims.

Having now described my invention, I claim:—

1. In an article of the character described, a frame member and a latch member, the frame member including a pair of spaced side elements extending in the same general direction and resiliently connected at one end, and the latch member being slidable on one of the side elements, to vary the grip of the device on a rope, cord, or the like, held thereby, one of the side elements being movable laterally, relatively to the other side element, to release the latch member from engagement with the side element by which it is not carried.

2. In an article of the character described, a frame member and a latch member, the frame member including a pair of normally substantially parallel side elements, resiliently joined at one end, said elements being connected at their opposite ends for relative lateral movement, and the latch member being connected to one of the sides adapted to rest against the other side and retain in its grip a held member, and capable of releasing said held member by applying lateral pressure to one of the side elements.

3. In an article of the character described, a frame member and a latch member, the frame member including a pair of resiliently connected side members, adapted to have their distance apart varied to release the latch member from holding position, or retain it in holding position the latch member being pivotally connected to one of the side elements and being held in contact with the other element by a held member.

4. In an article of the character described, a frame member and a latch member, the frame member including a pair of resiliently connected side members, adapted to have their distance apart varied, the latch member being pivotally connected to one of the side elements and being held in contact with the other element by a held member.

5. In an article of the character described, a frame member and a latch member, the frame member including a pair of resiliently connected side members, adapted to have their distance apart varied, the latch member being pivotally connected to one of the side elements and being held in contact with the other element by a held member, the side elements being relatively separable to release the latch member, so that the held member may be disconnected.

6. In a holder for a flexible member, a frame having opposite sides, capable of moving pivotally relatively to each other, in a plane, a latch member pivoted to one of the sides and engaging the other side and capable of being released from the latter upon relative movement of the said sides.

7. In a holder for a flexible member, a frame having opposite sides, capable of moving relatively to each other, in a plane, a latch member pivoted to one of the sides and engaging the other side and capable of being released from the latter upon relative movement of the said sides, the latch being weighted to cause the same to assume a position in which a rope, cord, or the like, may be readily applied.

8. In a holder for a flexible member, a frame having opposite sides, capable of moving relatively to each other, in a plane, a latch member pivoted to one of the sides and engaging the other side and capable of being released from the latter upon relative movement of the said sides, said sides being connected at one end by a resilient loop.

9. In a holder for a flexible member, a frame having opposite sides, capable of moving relatively to each other, in a plane, a latch member pivoted to one of the sides and engaging the other side and capable of being released from the latter upon relative movement of the said sides, said sides being relatively rigidly connected at one end and having at said end an attaching loop.

10. In a holder for a flexible member, a frame having opposite sides, capable of moving relatively to each other, in a plane, a latch member pivoted to one of the sides and engaging the other side and capable of being released from the latter upon relative movement of the said sides, there being resilient means to urge said sides toward each other.

11. In a holder for a flexible member, a frame having opposite sides, capable of moving relatively to each other, in a plane, a latch member pivoted to one of the sides and engaging the other side and capable of being released from the latter upon relative movement of the said sides, said frame having a cross bar extending between the sides thereof to co-operate with the locking member to grip and hold a flexible member.

12. In a holder for a flexible member, a frame having opposite sides, capable of moving relatively to each other, in a plane, a latch member pivoted to one of the sides and engaging the other side and capable of being released from the latter upon relative movement of the said sides, said frame having a cross bar extending therebetween to co-operate with the locking member to grip and hold a flexible member, said cross bar being bent upwardly, slightly, to cause the latch member to more securely grip the flexible member.

13. In an article of the character described, a frame member and a latch member, the frame member including a pair of resiliently connected side members, adapted to have their distance apart varied to release the latch member from holding position or retain it in holding position, means for actuating one of the side elements relatively to the other, whereby the latch member may be released from engagement with said other side element.

In witness whereof, I hereunto subscribe my name to this specification.

WILLIAM HASTINGS HUTTER.